(12) United States Patent
Fan et al.

(10) Patent No.: US 8,910,878 B2
(45) Date of Patent: Dec. 16, 2014

(54) RFID TAG ANTENNA

(75) Inventors: Chen-Jyh Fan, Hsinchu County (TW);
Chia-Ti Lin, Changhua County (TW);
Jenn-Hwan Tarng, Taichung (TW);
Sheng-Che Chueh, New Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 223 days.

(21) Appl. No.: 13/369,758

(22) Filed: Feb. 9, 2012

(65) Prior Publication Data

US 2013/0119143 A1 May 16, 2013

(30) Foreign Application Priority Data

Nov. 15, 2011 (TW) .............................. 100141668 A (51) Int. Cl.
*G06K 19/06* (2006.01)

(52) U.S. Cl.
USPC .......................................... 235/492; 235/487

(58) Field of Classification Search
USPC ........................... 235/380, 382, 375, 487, 492
See application file for complete search history.

(56) References Cited

U.S. PATENT DOCUMENTS

| 7,432,816 | B1 | 10/2008 | Ku et al. | |
| 2006/0017571 | A1* | 1/2006 | Arnold et al. | 340/572.7 |
| 2011/0115685 | A1 | 5/2011 | Chang | |
| 2012/0206309 | A1* | 8/2012 | Lavedas et al. | 343/742 |

FOREIGN PATENT DOCUMENTS

| TW | 200634651 | | 10/2006 |
| TW | 201119125 | A1 | 6/2011 |
| WO | WO 2010/021217 | A1 | 2/2010 |
| WO | WO 2011/002049 | A1 | 1/2011 |

OTHER PUBLICATIONS

Bjorninen et al., Design and RFID Signal Analysis of a Meander Line UHF RFID Tag Antenna, IEEE Antennas Propag, Nov. 5, 2008.
Braaten et al., A Compact Meander-Line UHF RFID Tag Antenna Loaded With Elements Found in Right/Left-Handed Coplanar Waveguide Structures, IEEE Antennas and Wireless Propagation Letters, vol. 8, 2009.
Braaten, A Novel Compact UHF RFID Tag Antenna Designed with Series Connected Open Complementary Split Ring Resonator (OCSRR) Particles, IEEE Transactions on Antennas and Propagation, vol. 58, No. 11, Nov. 2010.
Lin et al., A Capacitively Coupling Multifeed Slot Antenna for Metallic RFID Design, IEEE Antennas and Wireless Propagation Letters, vol. 9, 2010.
Zhou, A Novel Slot Antenna for UHF RFID Tag, Wireless, Mobile and Multiedia Networks (ICWMNN 2010).
Ziolkowaski, Metamaterial-Based Antennas:Research and Develpments, IEICE Trans. Electron., vol. E89-C, No. 9, Sep. 2006.

* cited by examiner

*Primary Examiner* — Karl D Frech
(74) *Attorney, Agent, or Firm* — Birch, Stewart, Kolasch & Birch, LLP (57) ABSTRACT

The present disclosure relates to a radio frequency identification (RFID) tag antenna. The RFID tag antenna includes: a substrate having a first surface and a second surface, a feeding structure mounting on the first surface and a rotation structure mounting on the second surface. Specifically, the feeding structure corresponds to the rotation structure for forming a resonant circuit.

16 Claims, 9 Drawing Sheets

RFID TAG ANTENNA

TECHNICAL FIELD

The present disclosure relates to a radio frequency identification (RFID), more particularly, to effectively reduce the size of the RFID tag antenna so as to easy integrate the RFID tag antenna into the printed circuit board and mount in the small-scale electronic products.

TECHNICAL BACKGROUND

Radio Frequency IDentification (RFID) is a communication technology, which can identify a specific target and read the corresponding data via a wireless signal without a mechanical or optical contact between an identifying system and the specific target. As the wireless RFID technology became more popular, many hand held devices are installed with RFID antenna.

RFID tag antenna can be categorized into, according to its operating frequencies, low-frequency antenna, high-frequency antenna, ultra-high frequency antenna, and microwave antenna. The low-frequency antenna is operating within the range of 125 kHz to 134 kHz; the high frequency antenna is operating at 13.56 MHz; the ultra-high frequency antenna is operating within the range of 840 MHz~960 MHz; and microwave antenna is operating within the range of 2.45 GHz~5.8 GHz. Generally speaking, the wireless RFID tag antenna installed in the hand held electronic apparatus belongs to an ultra-high frequency antenna, and the ultra-high frequency antenna uses radiation for its transmission.

Figure 1A:
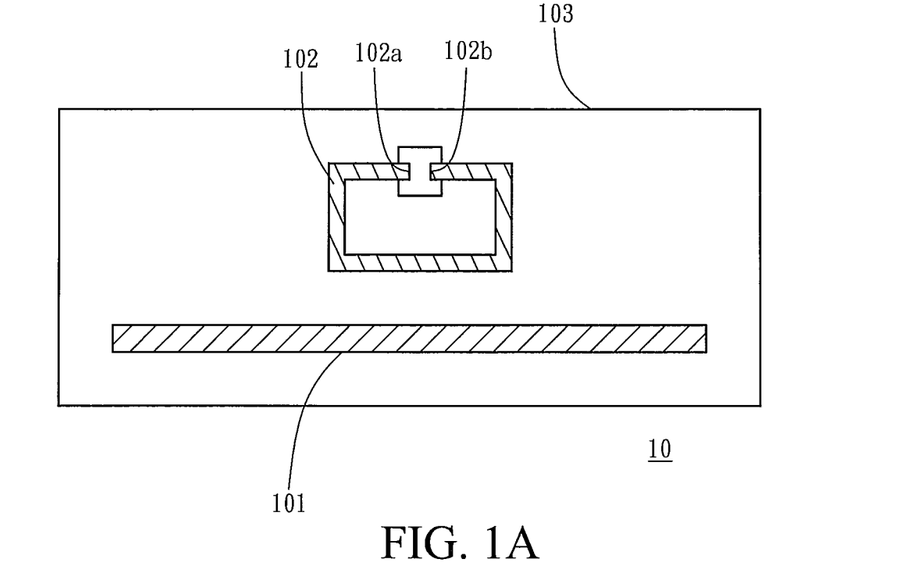
FIG. 1A illustrates a conventional RFID tag.
Figure 1B:
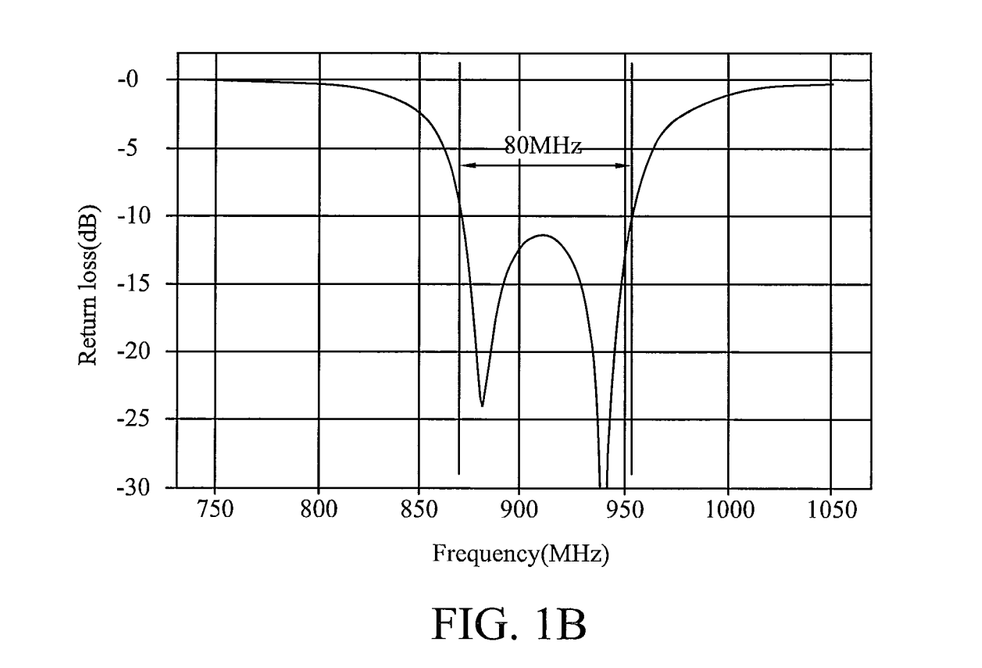
FIG. 1B illustrates a plot of bandwidth of operating frequency of the conventional RFID tag antenna
Figure 2:
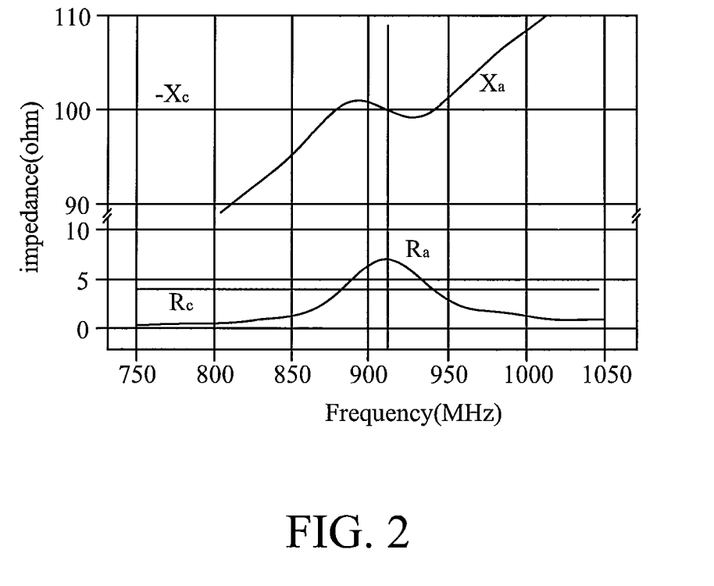
FIG. 2 illustrates the impedance match between the conventional RFID tag antenna and the chip on the same.

FIG. 1A illustrates a conventional RFID tag 10 and its impedance match method. As shown in FIG. 1A, the conventional RFID tag 10 comprises an antenna body 101 and a couple loop 102, which disposed on a substrate 103 with two feed-in points 102a/102b. For the reason of impedance match, the couple loop 102 can be deemed as a small-scale inductor, barely having any radiation function. Alternatively, in order to achieve the impedance match between the antenna and its chip, inevitably, the small-scaled loop 102, barely having any radiation function, (the small couple loop 102 is usually smaller than 30% of the size of the antenna body 101) so as to ensure the input impedance for the antenna has appropriate inductive reactance and accordingly the capacitive reactance of the chip can be eliminated and further a conjugate match can be achieved. In the case of the match, the return loss of the input port can be illustrated in FIG. 1B, and its impedance characteristics can be further illustrated in FIG. 2 (where the real part of the input impedance of the antenna is denoted as Ra, the imaginary part is denoted as Xa; and, the real part of the input impedance of the chip is denoted as Rc, and the imaginary part is denoted as Xc)

Accordingly, the conventional RFIG tag antenna is easy interfered by the external noise and factor, resulting in it is hard to reduce the size of the antenna to design in the small-scale electronic products.

TECHNICAL SUMMARY

In one embodiment, the present disclosure relates to a RFID tag antenna, comprising: a substrate, having a first surface and a second surface; a feeding structure, mounted on the first surface; and a rotation structure, mounted on the second surface; wherein the feeding structure corresponds to the rotation structure for forming a resonant circuit.

In one embodiment, the present disclosure relates to a method for manufacturing RFID tag antenna, comprising: providing a substrate, and the substrate has a first surface and a second surface; and respectively mounting a feeding structure and a rotation structure on the first surface and the second surface; wherein the feeding structure corresponds to the rotation structure for forming a resonant circuit.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 3:
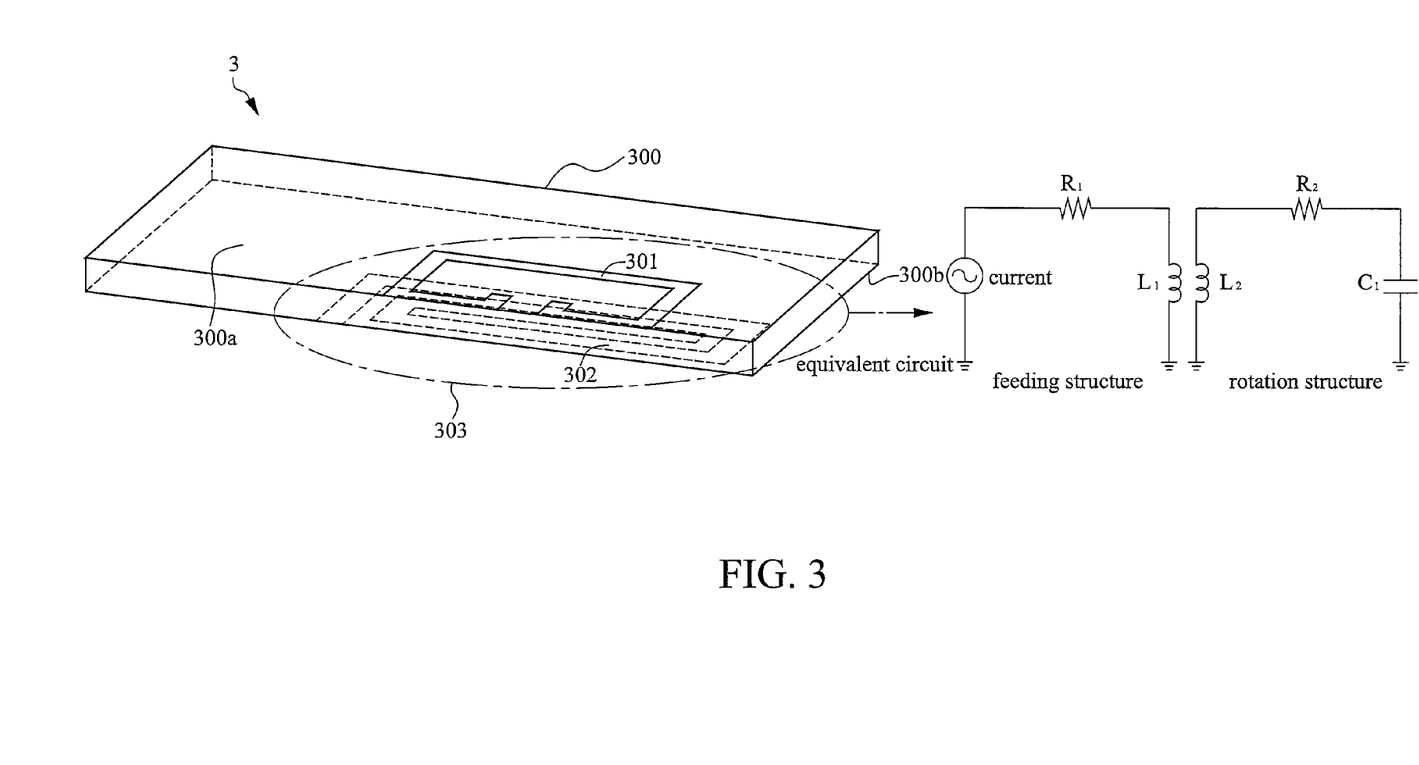
FIG. 3 illustrates a RFID tag antenna 3 according to one embodiment of the present disclosure.

FIG. 3 illustrates a RFID tag antenna 3 according to one embodiment of the present disclosure. The RFID tag antenna 3 comprises: a substrate 300 having a first surface 300a and a second surface 300b, a feeding structure 301 mounted on the first surface 300 a and a rotation structure 302 mounted on the second surface 300b. Specifically, the feeding structure 301 corresponds to the rotation structure 302 for forming a resonant circuit 303. Moreover, the RFID tag antenna 3 consists of the feeding structure 301 and the rotation structure 302 is integrated on a substrate, and the substrate may be a printed circuit board with at least two layers. Additionally, the feeding structure 301 and the rotation structure 302 may be seen as a resonant circuit 303, which is equivalent as an equivalent circuit with a source, registers $R_1$, $R_2$, inductors $L_1$, $L_2$ and capacitor $C_1$. In actual requirement and design, the resonant frequency is locked at the demanded ultra high frequency (UHF) band (for example, 992~998 MHz) or microwave band by adjusting the size of the resonant circuit.

Figure 4A:
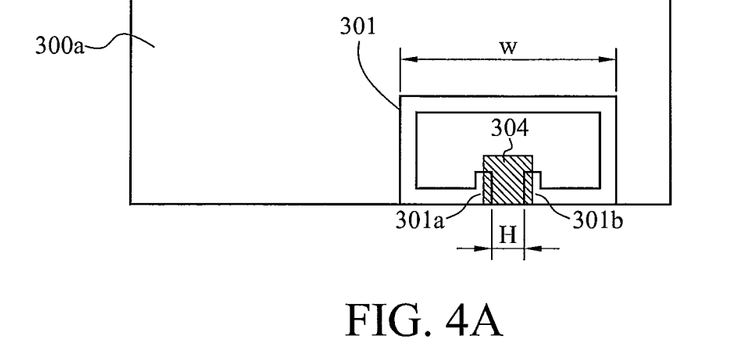
FIGS. 4A and 4B illustrate the detailed structure of the RFID tag antenna shown in FIG. 3.
Figure 4B:
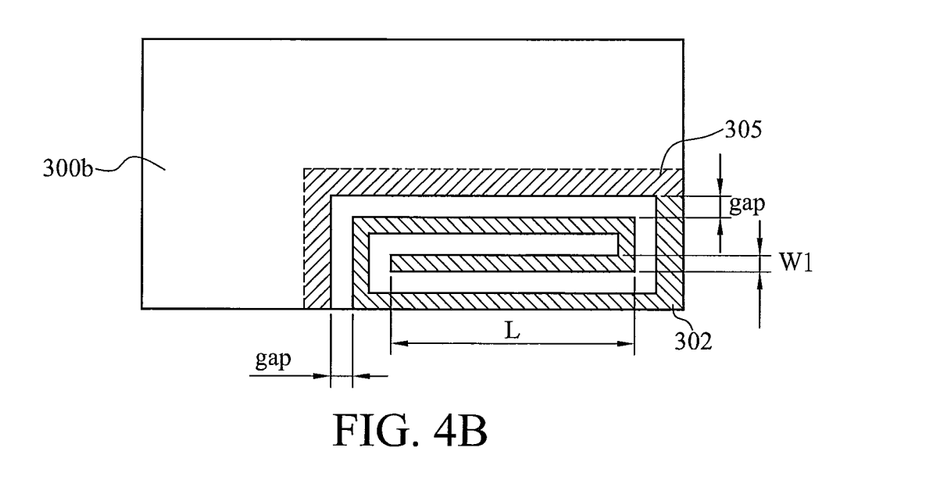

FIG. 4A~4B illustrate the detailed structure diagram of FIG. 3. As shown in FIG. 4A, it is clear to see the upper (the first surface 300a) of the feeding structure 301, and the feeding structure 301 has at least one input port, and in the embodiment, the feeding structure 301 has a first input port 301a and a second input port 301b, and the first and second input ports 301a, 301b are mounted on the feeding structure 301. Generally speaking, the first and second input ports 301a, 301b are usually mounted on center of the feeding structure 302, but it is not limited herein. In the embodiment, the feeding structure is a rectangular feeding structure, and the rectangular feeding structure has an opening H. Although the shape of the feeding structure 301 is set as the rectangular rotation structure, its shape may be changed in accordance with the actual requirement and design. Additionally, the RFID tag antenna further comprises a chip 304, which is disposed on the input port 301a, 301b of the feeding structure 301, and width W of the rotation structure 301 is adjusted to change impedance value of an input impedance of the RFID tag antenna for forming an impedance matching between the chip 304 and the input impedance. As shown in FIG. 4B, it is clear to see the lower (the second surface 300b) of the rotation structure 302, and one terminal of the rotation structure 302 is coupled to a ground 305, and there is a gap between the rotation structure 302 and the ground 305. In the embodiment, the gaps set in the rotation structure 302 are same size, and the widths w1 set in the rotation structure 302 are also same size. However, the skilled person in the art should understand the size of the gap and the width in the rotation structure in the present disclosure can be changed according to the actual requirement and design. The gap must be kept between the rotation structure 302 and the ground 305, and size of the gap is adjusted to change the resonant frequency of the resonant circuit 303, and length L of the rotation structure 302 is adjusted to change the position of the resonant frequency of the resonant circuit 303. Moreover, the length L is defined as distance between two terminals of the rotation structure 302, and the length L can be adjusted so as to achieve the goal of adjusting the imaginary part of the parameters for impedance match between the chip and the feeding structure 302, and the skilled person in the art can vary the same without departing the scope of view of the invention. Moreover, the material of the feeding structure 301 and the rotation structure 302 may be the metal, for example, cooper foil.

In order to effectively achieve the resonance effect, a coupler formed by the rectangular feeding structure 301 and a chip 304 mounted on the input ports 301a, 301b corresponds to the rotation structure 302 for forming the inductive effect so as to transfer the energy, and therefore the resonant circuit with coupling manner formed by the coupler and the rotation structure 302. As shown in FIGS. 4A and 4B, it makes the portion of the feeding structure 301 with the rectangular shape as the shape of the coupler, and therefore there is the inductive effect on the imaginary-part impedance of the entire input port in the tag antenna so as to match the capacitance effect on the imaginary-part impedance of the chip. In addition, the gap between the rotation structure (resonator) 302 and ground is adjusted to change the capacitance effect value so as to adjust the resonant frequency. Besides, the length L of the rotation structure (resonator) 302 is adjusted to change the inductive effect value so as to adjust the position of the resonant frequency.

Figure 5:
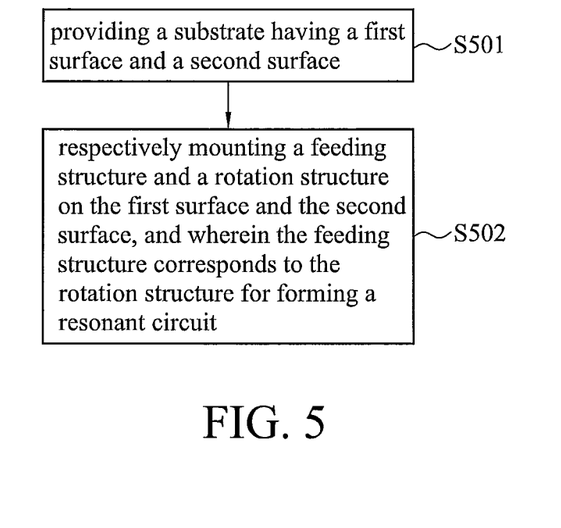
FIG. 5 is a flow chart showing a method for manufacturing RFID tag antenna according to one embodiment of the present disclosure.

FIG. 5 is a flow chart showing a method for manufacturing RFID tag antenna according to one embodiment of the present disclosure, and it needs to refer to FIG. 4A~4B to describe the steps of method for manufacturing RFID tag antenna. The steps of method comprises: (step s501) providing a substrate 300, and the substrate 300 has a first surface 300a and a second surface 300b; and (step s502) respectively mounting a feeding structure 301 and a rotation structure 302 on the first surface 300a and the second surface 300b, and wherein the feeding structure 301 corresponds to the rotation structure 302 for forming a resonant circuit 303. Specifically, the feeding structure 301 has at least one input port (for example, 301a and 301b), and the feeding structure 301 is a rectangular feeding structure, and the rectangular feeding structure has an opening H. The method for manufacturing RFID tag antenna further comprises: disposing a chip 304 on the input port of the feeding structure 301, and adjusting width W of the rotation structure 301 to change impedance value of an input impedance for forming an impedance matching between the chip 304 and the input impedance. The method for manufacturing RFID tag antenna further comprises: coupling one terminal of the rotation structure 302 to a ground 305, and there is a gap between the rotation structure 302 and the ground 305, and adjusting size of the gap to change the resonant frequency of the rotation circuit 303, and further adjusting length L of the rotation structure 302 to change the position of the resonant frequency of the rotation circuit. In the embodiment, the length L can be adjusted so as to achieve the goal of adjusting the imaginary part of the parameters for impedance match between the chip and the feeding structure 302, and the skilled person in the art can vary the same without departing the scope of view of the invention.

Figure 6A:
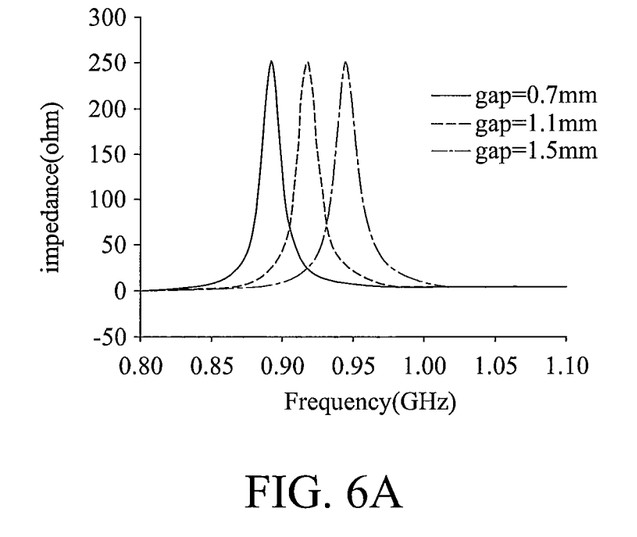
FIG. 6A~6B illustrate the characteristic curve diagram of adjusting gap in accordance with the present disclosure.
Figure 6B:
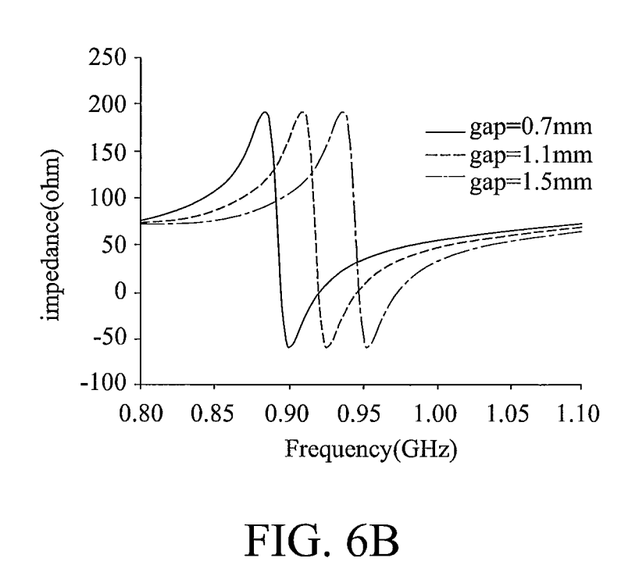
Figure 7A:
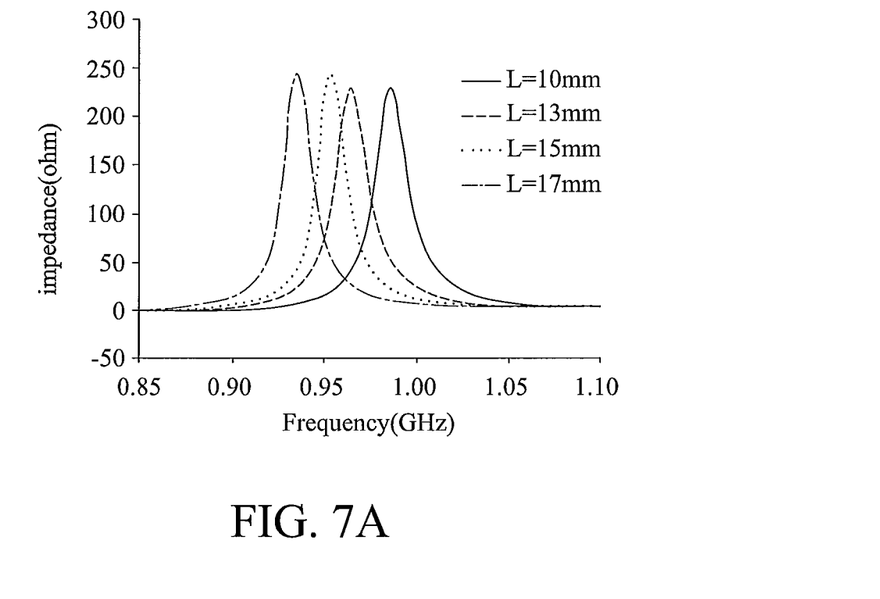
FIG. 7A~7B illustrate the characteristic curve diagram of adjusting length in accordance with the present disclosure.
Figure 7B:
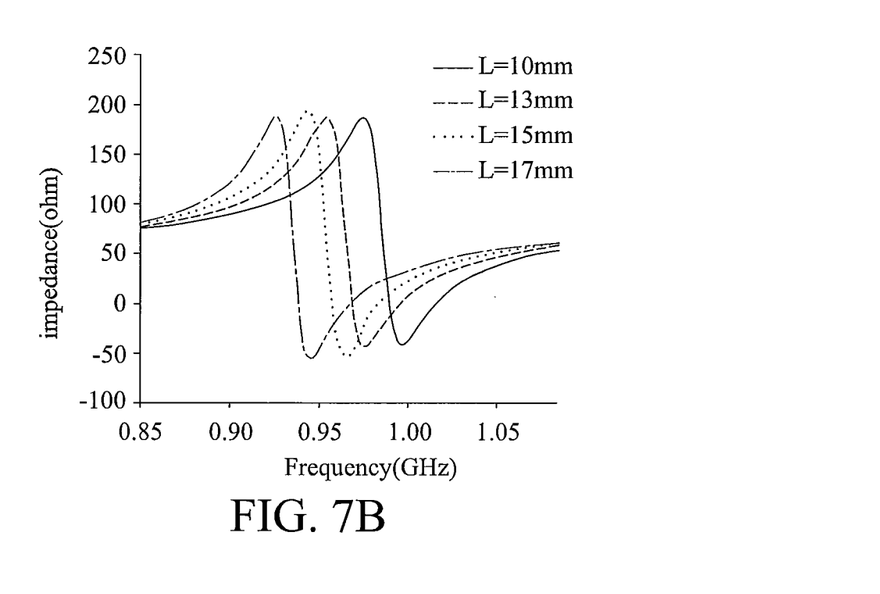
Figure 8A:
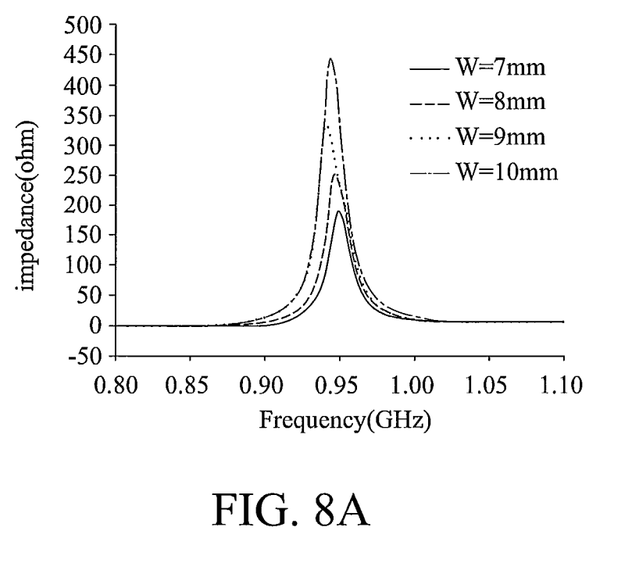
FIG. 8A~8B illustrate the characteristic curve diagram of adjusting width in accordance with the present disclosure.
Figure 8B:
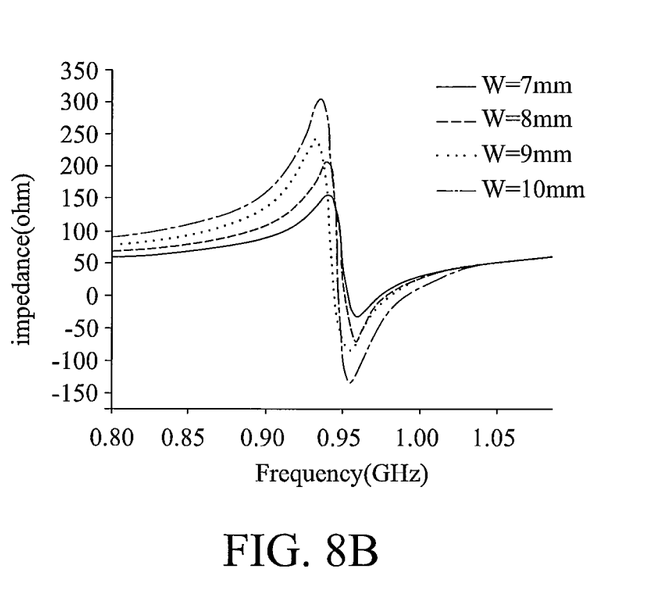

As shown in FIG. 6~7, the adjusted result in the present disclosure is further verified. In accordance with FIGS. 6A and 6B, it can understand that the gap is adjusted to change the equivalent capacitance in the resonant circuit so as to adjust the resonant frequency. When the gap is getting smaller, the capacitance effect is getting bigger and the resonant frequency offsets toward the lower frequency. In accordance with FIGS. 7A and 7B, it describes that the length L is adjusted to change the equivalent inductance value in the resonant circuit so as to adjust the position of the resonant frequency. When the length is getting longer, the inductive effect is getting bigger and the position of the resonant frequency offset toward the lower frequency. In accordance with FIGS. 8A and 8B, it can observes the width W of the feeding structure (the coupler) is adjusted to change the input impedance. When the width is getting wider, the input impedance is getting larger. The antenna structure of the present disclosure must not depend on the physical length to achieve the resonant consideration, and therefore the present disclosure may rapidly and effectively reduce the size of the demand RFID tag antenna so as to save the design area in the printed circuit board.

Figure 9:
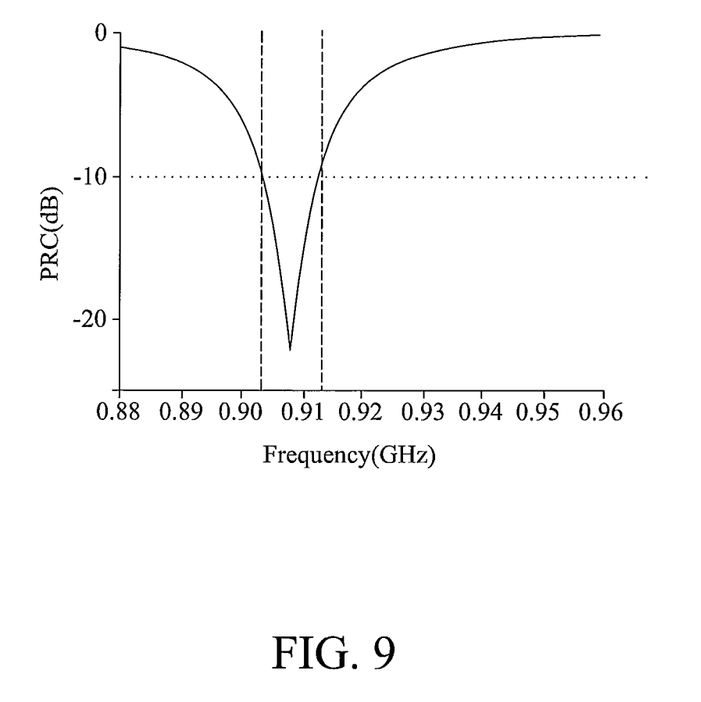
FIG. 9 illustrates a power reflection coefficient (PRC) in accordance with the present discourse.

FIG. 9 illustrates a power reflection coefficient (PRC) in accordance with the present discourse achieving the demand operation band under the match. FIG. 4~5 illustrates an RFID tag antenna operating in UHF band, but the length of the antenna body can be also adjusted so as to serve the purpose of higher operating frequencies such as 2.45 GHz~5.8 GHz, and the coupler can be also adjusted accordingly without duplicate description.

The disclosure relates a RFID tag antenna with small size, which consists of two portions: the loop coupler mounted at the feeding terminal and the equivalent resonant circuit mounted at the radiation terminal. In the disclosure, the antenna size is not limited by the physical length. Moreover, the antenna structure disclosed by the embodiment may not only achieve the goal of reducing the antenna size, but also use the resonant circuit to attain the radiation purpose while the RFID tag antenna is used to transmit the information. The disclosure utilizes the RFID tag antenna to effectively reduce the size of RFID antenna located in the UHF band, and easy integrated into the printed circuit board so as to record the information related to the small-scale electronic products. Regarding to the manufacturing method for RFID tag antenna in the present disclosure, it may design the RFID antenna in the blank area of the printed circuit board, and the perfected design position is located at the corner or edge of the printed circuit board. However, the skilled person in the art should understand it still considers the actual requirement and design when the perfected design position is set. Moreover, a real-part impedance of the tag antenna is depend on the size and shape of the feeding loop of the tag antenna, and the size and the shape thereof may be adjusted for matching a real-part impedance of the tag antenna with a real-part impedance of the chip. Moreover, an imaginary-part impedance of the tag antenna is depend on the shape and the total length of the tag antenna and the distance between the ground and the tag antenna, and the shape, the total length and the distance may be adjusted for matching an imaginary-part impedance of the tag antenna with an imaginary-part impedance of the chip. Additionally, the length of conventional antenna is depend on the transmit frequency, but the disclosure adapts the concept of Zeroth-Order Resonator and the element value of the resonant circuit to achieve the resonant frequency, rather than the physical length.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A RFID tag antenna, comprising:
    a substrate, having a first surface and a second surface;
    a feeding structure, mounted on the first surface; and
    a rotation structure, mounted on the second surface;
    wherein the feeding structure corresponds to the rotation structure for forming a resonant circuit, one terminal of the rotation structure is coupled to a ground, and there is a gap between the rotation structure and the ground, a size of the gap being adjustable to change the resonant frequency of the rotation circuit.

2. The RFID tag antenna of claim 1, wherein the feeding structure has at least one input port.

3. The RFID tag antenna of claim 2, wherein the feeding structure is a rectangular feeding structure, and the rectangular feeding structure has an opening.

4. The RFID tag antenna of claim 2, comprising:
    a chip, disposed on the input port of the feeding structure.

5. The RFID tag antenna of claim 4, wherein width of the rotation structure is adjusted to change impedance value of an input impedance for forming an impedance matching between the chip and the input impedance.

6. The RFID tag antenna of claim 1, wherein length of the rotation structure is adjusted to change the position of the resonant frequency of the rotation circuit.

7. The RFID tag antenna of claim 6, wherein the length is defined as distance between terminals of the rotation structure.

8. The RFID tag antenna of claim 1, wherein the substrate is a printed circuit board with at least two layers.

9. A method for manufacturing RFID tag antenna, comprising:
    providing a substrate having a first surface and a second surface;
    respectively mounting a feeding structure and a rotation structure on the first surface and the second surface;
    coupling one terminal of the rotation structure to a ground, and forming a gap between the rotation structure and the ground; and
    adjusting a size of the gap to change the resonant frequency of the resonant circuit,
    wherein the feeding structure corresponds to the rotation structure for forming a resonant circuit.

10. The method of claim 9, wherein the feeding structure has at least one input port.

11. The method of claim 10, wherein the feeding structure is a rectangular feeding structure, and the rectangular feeding structure has an opening.

12. The method of claim 10, comprising:
    disposing a chip on the input port of the feeding structure.

13. The method of claim 12, further comprising:
    adjusting width of the rotation structure to change impedance value of an input impedance for forming an impedance matching between the chip and the input impedance.

14. The method of claim 9, further comprising:
    adjusting length of the rotation structure to change the position of the resonant frequency of the resonant circuit.

15. The method of claim 14, wherein the length is defined as distance between terminals of the rotation structure.

16. The method of claim 9, wherein the substrate is a printed circuit board with at least two layers.

* * * * *